United States Patent
Döring

(10) Patent No.: US 8,201,399 B2
(45) Date of Patent: *Jun. 19, 2012

(54) APPARATUS FOR REDUCING DIBENZODIOXIN EMISSIONS AND DIBENZOFURAN EMISSIONS FROM TRANSITION METAL-CONTAINING CATALYZERS

(75) Inventor: Andreas Döring, Munich (DE)

(73) Assignee: MAN Truck & Bus AG, München (DE)

( * ) Notice: Subject to any disclaimer, the term of this patent is extended or adjusted under 35 U.S.C. 154(b) by 712 days.

This patent is subject to a terminal disclaimer.

(21) Appl. No.: 12/355,938

(22) Filed: Jan. 19, 2009

(65) Prior Publication Data

US 2009/0199545 A1   Aug. 13, 2009

(30) Foreign Application Priority Data

Feb. 12, 2008  (DE) .......................... 10 2008 008 786

(51) Int. Cl.
*B01D 53/34* (2006.01)
*F01N 3/10* (2006.01)

(52) U.S. Cl. .............. 60/302; 60/299; 60/301; 423/210; 423/212; 422/171; 422/177; 422/180

(58) Field of Classification Search .................. 422/170, 422/169, 171, 177, 180; 60/299, 300, 301, 60/302; 423/210, 212
See application file for complete search history.

(56) References Cited

U.S. PATENT DOCUMENTS

| | | | |
|---|---|---|---|
| 4,170,571 A | 10/1979 | Ritscher | |
| 4,902,487 A | 2/1990 | Cooper | |
| 4,999,173 A | 3/1991 | Kamiyama | |
| 5,017,538 A | 5/1991 | Takeshima | |
| 5,024,981 A | 6/1991 | Speronello | |
| 6,805,849 B1 | 10/2004 | Andreasson | |
| 7,357,900 B2* | 4/2008 | Bartley et al. | 422/168 |
| 7,431,895 B2 | 10/2008 | Pfeifer | |
| 7,506,504 B2* | 3/2009 | Kumar | 60/299 |
| 7,802,419 B2* | 9/2010 | Doring | 60/286 |
| 7,850,934 B2* | 12/2010 | Doring | 423/212 |
| 7,856,809 B2* | 12/2010 | During | 60/295 |
| 7,998,423 B2* | 8/2011 | Boorse et al. | 422/180 |
| 2005/0031514 A1 | 2/2005 | Patchett | |
| 2008/0202107 A1* | 8/2008 | Boorse et al. | 60/301 |

FOREIGN PATENT DOCUMENTS

| | | |
|---|---|---|
| DE | 10327030 | 2/1986 |
| DE | 3428232 | 6/1986 |
| EP | 1072765 | 1/2001 |
| JP | 2004376102 | 7/2006 |

* cited by examiner

*Primary Examiner* — Nina Bhat
(74) *Attorney, Agent, or Firm* — Cozen O'Connor

(57) ABSTRACT

Apparatus for reducing emissions of PCDD and PCDF in exhaust gas of an internal combustion engine includes a transition metal-containing catalyzer for the selective catalytic reduction of nitric oxides, and a molecular sieve upstream of the catalyzer, either as a layer on the catalyzer or on a separate structure. The molecular sieve blocks hydrocarbons from reaching the transition metal-containing catalyzer.

22 Claims, No Drawings

APPARATUS FOR REDUCING DIBENZODIOXIN EMISSIONS AND DIBENZOFURAN EMISSIONS FROM TRANSITION METAL-CONTAINING CATALYZERS

BACKGROUND OF THE INVENTION

1. Field of the Invention

The invention is directed to an apparatus for reducing PCDD and PCDF emissions from SCR catalyzers which reduce nitric oxides in the exhaust gas of an internal combustion engine.

2. Description of the Related Art

Along with solids particles, nitric oxides are some of the limited components of exhaust gas which are formed during combustion processes. Permissible emissions of these components continue to be lowered. At present, various methods are employed to minimize these exhaust gas components in internal combustion engines for motor vehicles. Reduction of nitric oxides is usually accomplished by means of catalyzers; reducing agents are additionally required in oxygen-rich exhaust to increase selectivity and $NO_X$ conversion. These methods have come to be known under the umbrella term of SCR (Selective Catalytic Reduction) methods. They have been used for many years in the energy industry and more recently in internal combustion engines. A detailed exposition of these methods is given in DE 34 28 232 A1. $V_2O_5$-containing mixed oxides, e.g., in the form of $V_2O_5/WO_3/TiO_2$, can be used as SCR catalysts. $V_2O_5$ proportions typically range between 0.2% and 3%. In practical applications, ammonia or compounds which split off ammonia such as urea or ammonia formiate are used in solid state or in solution as reducing agents. One mole of ammonia is needed to convert one mole of nitric monoxide.

$$4NO+4NH_3+O_2 \Leftrightarrow 4N_2+6H_2O \qquad (1)$$

When a platinum-containing NO oxidation catalyzer for forming $NO_2$ is placed in front of the SCR catalyzers

$$2NO+O_2 \Leftrightarrow 2NO_2 \qquad (2),$$

the SCR reaction is accelerated considerably and the low-temperature activity is markedly increased.

$$NO+2NH_3+NO_2 \Leftrightarrow 2N_2+3H_2O \qquad (3)$$

Nitric oxide reduction using the SCR method in internal combustion engines operating in vehicles is difficult because of the changing operating conditions, which makes it difficult to apportion the reducing agent in amount. On the one hand, the greatest possible conversion of nitric oxides must be achieved; but on the other hand emission of unspent ammonia must be prevented. This problem is often solved by using an ammonia blocking catalyzer downstream of the SCR catalyzer to convert the excess ammonia to nitrogen and water vapor.

Particle separators, as they are called, or particle filters are used in the power industry and in vehicles to minimize fine particles.

A typical arrangement with particle separators for use in vehicles is described, for example, in EP 1 072 765 A1. Arrangements of this kind differ from those using particle filters in that the diameter of the channels of the particle separator is substantially greater than the diameter of the largest occurring particle, while the diameter of the filter channels in particle filters is in the range of the diameter of the particles.

Due to this difference, particle filters are subject to blockage, which increases the exhaust gas counterpressure and lowers engine performance. An arrangement and a method with particle filters are shown in U.S. Pat. No. 4,902,487. A distinguishing feature of the two above-mentioned arrangements and methods is that the oxidation catalyzer—usually a catalyzer with platinum as active material—arranged upstream of the particle separator or particle filter oxidizes the nitrogen monoxide in the exhaust gas to form nitrogen dioxide according to equation (2) by means of the residual oxygen which is also contained. In this regard, it must be ensured that the equilibrium of the aforementioned reaction lies on the side of NO at high temperatures. As a result, the achievable $NO_2$ proportions are limited at high temperatures due to this thermodynamic limitation.

This $NO_2$ is in turn converted in the particle separator or particle filter with the carbon particles to form CO, $CO_2$, $N_2$ and NO.

There is a continuous removal of the deposited fine particles by means of the powerful oxidizing agent $NO_2$, so that regeneration cycles such as those which must be laboriously carried out in other arrangements are dispensed with. For this reason, this is referred to as "passive" regeneration.

$$2NO_2+C \Leftrightarrow 2NO+CO_2 \qquad (4)$$

$$NO_2+C \Leftrightarrow NO+CO \qquad (5)$$

$$2C+2NO_2 \Leftrightarrow N_2+2CO_2 \qquad (6)$$

If the $NO_2$ does not succeed in effecting a complete oxidation of the carbon embedded in the particle filter, the carbon proportion and, therefore, the exhaust gas counterpressure increases.

At the present time, this is prevented by providing the particle filters with a catalytic coating for the oxidation of NO. As was already stated above, these catalyzers usually contain platinum. The disadvantage of this method is that the $NO_2$ formed at the particle filter can only be used for oxidation of particles which have been separated out downstream of the catalytically active layer for NO oxidation, that is, inside the filter medium. However, if a layer of separated particles, or a filter cake as it is called, should form on the filter surface and, therefore, on the catalytically active layer, the NO oxidation catalyzer lies downstream of the filter cake so that the soot particles separated out at that location cannot be oxidized by means of $NO_2$ from the NO oxidation catalyzer arranged on the particle filter.

In addition, only the catalyzer layer arranged on the raw gas side contributes, strictly speaking, to the performance of the system because the $NO_2$ that is formed catalytically on the purified gas side can no longer come into contact with the soot deposited on the raw gas side and inside the filter material.

Another problem arising from the coating of the particle filter is that the geometric surfaces of the filter are appreciably smaller than those of the catalyzer substrates that are normally used. The reason for this is that the filters require relatively large free cross sections and, therefore, free volume on the raw gas side to store soot and engine oil ashes. When ceramic filter substrates are used, this is implemented by means of a low porosity of 50 cpsi to 200 cpsi. On the other hand, simple catalyzers are usually constructed with cell densities of 400 cpsi to 900 cpsi. An increase from 50 cpsi to 900 cpsi results in an increase in the geometric surface from 1 $m^2/l$ to 4 $m^2/l$, which makes possible a substantial increase in throughput at the catalyzers.

For these reasons, an NO oxidation catalyzer cannot be omitted in front of the particle filter in spite of the catalytic coating of the filter. This leads to a relatively large structural volume. This is the case even when the NO oxidation catalyzers and particle filters form a constructional unit by constructing the input area of the particle filter as an NO oxidation catalyzer (DE10327030 A1).

Although these steps allow soot oxidation up to temperatures of 250° C., there are applications in which even these exhaust gas temperatures cannot be reached and, therefore, reliable functioning of the particle filters cannot be ensured. This normally occurs in lightly loaded engines installed in vehicles, for example, in passenger cars, public buses, and garbage collection trucks, which, moreover, also have high idling proportions.

Therefore, a second possibility for particle filter regeneration is applied especially in these cases: actively raising the exhaust gas temperature. Usually this is accomplished by adding hydrocarbons upstream of oxidation catalyzers. The exothermal oxidation of the hydrocarbons at the catalyzers leads to an appreciable rise in temperature.

When the temperature is successfully increased to more than 600° C. in this way, the carbon is oxidized by means of oxygen.

$$C + O_2 \Rightarrow CO_2 \tag{7}$$

However, the risk in this so-called "active" filter regeneration is that the burning of the soot will lead to a sharp rise in temperature of up to 1000° C. and, therefore, usually to damage to the particle filter and/or catalyzers arranged downstream.

Since the temperature increase must be maintained for several minutes to ensure a quantitative oxidation of the soot particles, the need for hydrocarbons is significant and, because the fuel in the internal combustion engine is usually used as a source of hydrocarbons, its efficiency is impaired.

The addition of hydrocarbons can be carried out by means of a separate injection nozzle arranged in the exhaust system. Another possibility is to generate high hydrocarbon emissions by means of a delayed after-injection of fuel into the combustion chamber.

In order to meet future exhaust gas regulations, it will be necessary to use arrangements for reducing nitric oxide emissions and arrangements for reducing fine particles emissions at the same time.

One solution is to coat the particle filter with SCR-active material (JP 2004-376102). In this connection, the use of $V_2O_5$ as an SCR-active component is difficult. This is due to the poor thermal stability of these catalyzers. Accordingly, exhaust gas temperatures of more than 650° C. lead to sublimation of $V_2O_5$. Since these temperatures can easily occur in particle filters, as was already mentioned above, $V_2O_5$-free catalyzers containing transition metals, especially iron-, cobalt-, or copper-containing catalyzers, are used for these high-temperature applications. The integration of these transition metals in zeolites through ion exchange has proven to be particularly advantageous in this connection (U.S. Pat. No. 5,017,538). In this way, because of the very large surface of the zeolites, it is possible to substantially enlarge the active surface and accordingly appreciably increase the achievable throughput.

The disadvantage of these transition metal-containing catalyzers, however, is that they form highly toxic polychlorinated dibenzodioxins (PCDD) and polychlorinated dibenzofurans (PCDF) in the presence of chloride and hydrocarbons in the temperature range between 200° C. and 400° C. In the vehicle, the chloride needed for dioxin formation reaches the exhaust gas and, accordingly, the catalyzers, e.g., through biofuels, the engine oil, or the intake air (salt spraying in winter, driving in coastal regions). The hydrocarbons needed for the formation of PCDD and PCDF are contained in the exhaust gas in any case because of the incomplete combustion of the fuel.

It is an object of the invention to prevent or reduce formation of these harmful substances.

SUMMARY OF THE INVENTION

The device according to the invention solves the problem of the formation of dioxins and furans in catalyzers with transition metals, particularly iron and/or copper and/or cobalt.

The basic idea is to prevent the hydrocarbons, particularly aromatic, benzene-containing, and possibly already chlorinated hydrocarbons constituting dioxin precursor substances, from coming into contact with the transition metals which form PCDD or PCDF, thus preventing the generation of PCDD and PCDF.

To this end, a molecular sieve is arranged, e.g., as a layer, upstream of the transition metal-containing catalyzer and/or is arranged at or on the latter. The pores of the molecular sieve through which the reactants from the flow of gas must diffuse at the surface of the catalyzer are designed in such a way that they are smaller than the molecular diameters of the hydrocarbon-containing PCDD precursor substances and PCDF precursor substances or PCDD or PCDF but larger than the molecular diameters of NO, $NO_2$, $O_2$ and $NH_3$. Accordingly, the molecules necessary for the reaction at the transition metal-containing catalyzer, e.g., SCR catalyzer, can reach the transition metal-containing catalyzer which is located downstream of the molecular sieve and/or below the molecular sieve, while the hydrocarbons responsible for the formation of dioxins can be kept away from the transition metal-containing catalyzer by the molecular sieve owing to steric effects. This works because the molecules NO, $NO_2$, $O_2$ and $NH_3$ relevant for the reactions at the transition metal-containing catalyzer, e.g., an SCR catalyzer, have diameters of 1.5 Å to 3 Å, while the diameters of the aromatic hydrocarbons, dioxins and furans are in the range of 12 Å to 26 Å, i.e., the pore diameters of the molecular sieve are therefore advantageously selected between 3 Å and 12 Å.

The molecular sieve can be arranged as a molecular sieve layer directly on the transition metal-containing catalyzer or on a carrier arranged upstream of the transition metal-containing catalyzer so as to achieve the necessary stability for the desired small layer thicknesses in an advantageous manner.

The defined pore diameters of the molecular sieve can be implemented relatively simply through the use of zeolites. Different lattice constants, structures and, therefore, pore diameters can be generated through the specific arrangement of $AlO_4$— and $SiO_4$-tetrahedra. Further, the use of silicates, metal silicates, aluminates, metal aluminates, silicophosphates, metal silicophosphates, silicoaluminophosphates, aluminophosphates, metal aluminophosphates, and aluminum silicates for the molecular sieve is advantageous.

The following framework types have proven to be particularly advantageous for the molecular sieve: AEN, OSI, EPI, ERI, FER, FAU, OFF, MFI, LTL, VFI, MAZ, MEI, EMT, CHA, KFI, BEA, MFS, MEL, MTW, EUO, MTT, HEU, FER, TON and MOR. The above-mentioned designations conform to the IZA (International Zeolite Association) nomenclature.

When the molecular sieve is constructed as a zeolite, the above-mentioned framework structures include the following zeolites: Mordenite, Epistilbite, Chabazite, Erionite, Mazzite, Ferrierite, Faujasite, Offretite, ZSM-3, ZSM-4, ZSM-5, ZSM-12, ZSM-18, ZSM-20, ZSM-22, ZSM-23, ZSM-34, ZSM-35, ZSM-38, ZSM-48, ZSM-50, Omega, Beta, Zeolite A, Zeolite L, Zeolite Y, Zeolite X, ZK-4, ZK-5, ZK-14, ZK-20, ZK-21 and ZK-22. The zeolites mentioned above can advantageously be used individually or in any combination as molecular sieve material.

The average layer thickness of the molecular sieve or molecular sieve layer should be at least 3 Å. Since the molecules NO, $NO_2$, $O_2$ and $NH_3$ necessary for the SCR reaction must first diffuse through the molecular sieve layer, the $NO_X$ conversions may be limited especially at high temperatures due to pore diffusion. Therefore, the average thickness of the molecular sieve or molecular sieve layer should not exceed 5 μm so that the influence of pore diffusion is not increased unnecessarily. In contrast, the layer thickness of the catalyzer layer in a catalyzer realized by means of coating or extrusion is usually between 5 μm and 500 μm.

To improve the conversion in the transition metal-containing catalyzer, it is useful to integrate the transition metals used as active components, e.g., copper and/or iron and/or cobalt, in a zeolite matrix, particularly the MFI and/or BEA type(s). However, it must be ensured that the molecular sieve or molecular sieve layer does not have any transition metals which generate PCDD or PCDF or at least a smaller amount of such components than the transition metal-containing catalyzer. When an SCR catalyzer is combined with a molecular sieve layer, a copper-containing catalyzer layer and an iron-containing molecular sieve layer can be combined since copper has a higher PCDD formation rate than iron.

The production of zeolite-containing catalyzers is described in U.S. Pat. Nos. 5,017,358; 4,999,173 and 4,170,571 and is therefore familiar to the person skilled in the art.

The zeolite type of the catalyzer and of the molecular sieve or molecular sieve layer may be identical or different depending on the application.

The catalyzers can be produced by extrusion or by coating a ceramic or metal substrate. Extrusion usually results in honeycomb catalyzers with parallel flow channels (U.S. Pat. No. 3,824,196), whereas with metal catalyzer substrates the shape and orientation of the flow channels can be freely selected to a great extent.

After the drying and/or calcination of the catalyzers, the molecular sieve layer is formed in another work step. Two different methods may be chosen for this purpose.

For one, it is possible to arrange a molecular sieve layer in a manner similar to the coating of substrates with a catalyzer washcoat. This layer must then be dried and calcinated similar to the catalyzers to ensure a stable, firm connection between the molecular sieve layer and catalyzer. When zeolites are used for the molecular sieve layer, the coating can be carried out by means of a zeolite-containing suspension. The average thickness of a layer applied in this way is usually in the range of 0.5 μm to 5 μm.

The molecular sieve layer can contain, in addition, active components enabling an oxidation of hydrocarbons and/or PCDD and/or PCDF. These include elements belonging to the platinum group of metals, tungsten, titanium, lanthanum, molybdenum, cerium, or manganese. When the elements are integrated in a zeolite structure, the sublimation temperatures are increased considerably owing to the high steam pressures within the pore structure, so that vanadium can even be used within the molecular sieve or molecular sieve layer up to 750° C.

Another possibility for forming the molecular sieve layer, particularly when using zeolite-containing SCR catalyzers, is to substitute the concentration of at least one transition metal at the catalyzer surface with a different ion having only a low PCDD-forming or PCDF-forming activity, or none at all, through ion exchange. In the simplest case, this is accomplished by introducing an acidic fluid. In so doing, the transition metal ions in the zeolite structure are replaced by protons from the acidic fluid.

Since hydrogen-containing zeolites have low stability, the protons should subsequently be exchanged for metal cations with a low PCDD-forming or PCDF-forming activity and/or hydrocarbon-oxidizing activity. As was already described above, elements belonging to the platinum group of metals, tungsten, titanium, lanthanum, molybdenum, cerium, manganese, or vanadium can be used for this purpose. Further, nonmetal cations can also be used. Depending on the affinity of these elements, the intermediate step of protonization can be omitted and the transition metals can be directly replaced through selection of a suitable pH. Extremely thin constructions are made possible by means of molecular sieve layers produced through ion exchange. Their average layer thickness is usually between 3 Å and 1 μm.

Another possibility for reducing constructional volume is to coat particle filters with transition metal-containing catalyzer material and then to provide them with a molecular sieve layer, for example, by impregnation, ion exchange or coating. However, it must be ensured that free flow channels are still available inside the particle filter after coating in order to prevent unnecessarily high exhaust gas counterpressure. Therefore, the exhaust gas flow within the filter structure should flow past, not through, the molecular sieve pores so that the reactants only penetrate into the molecular sieve pores by means of diffusion processes analogous to the processes at catalyzer substrates described above and accordingly reach the underlying catalyzer layer. This can be achieved, for example, by a high porosity of the catalyzer layer. A high porosity of this kind can be generated, for example, by mixing filler into the washcoat, which filler evaporates during calcination, or by mixing in zeolite-free, highly-porous washcoat additives or zeolite types with a high porosity and/or large pore diameter. Another possibility with respect to highly porous filter substrates would be to carry out a thin coating of filter material with the transition metal-containing catalyzer material that does not completely cover or close the filter material so that enough free flow channels would still remain inside the filter substrate. When the molecular sieve layer is formed subsequently, it must be ensured that this molecular sieve layer does not close the free flow channels but only lies upon the freely accessible surfaces of the transition metal-containing catalyzer layer as a thin layer. This can be carried out in an advantageous manner in zeolite-containing catalyzers by means of the ion exchange at the surface of the catalyzer as was already described above. As was likewise already stated, it must be ensured that the pore diameter of the molecular sieve is selected in such a way that the large hydrocarbon-containing PCDD precursor substances and PCDF precursor substances cannot pass the molecular sieve layer, whereas the smaller exhaust gas constituents like oxygen, nitrogen, carbon dioxide, nitric oxides, water, ammonia and carbon monoxide may pass through. If it is not possible to produce the molecular sieve layer on the transition metal-containing catalyzer by pure ion exchange, the catalyzer can be coated with molecular sieve material separately.

The particle filter on which is arranged the transition metal-containing catalyzer layer with the molecular sieve layer arranged thereon can advantageously be made of sintered metal and/or ceramic and/or filter foam and/or ceramic fibers and/or quartz fibers and/or glass fibers and/or silicon carbide and/or aluminum titanate.

The solution described above presents a particularly economical, space-saving and, therefore, advantageous possibility for a durable combination of the molecular sieve layer and the transition metal-containing catalyzer layer, e.g., SCR-active catalyzer layer, on a catalyzer substrate and/or on a particle filter so that they cannot be separated from one another without being destroyed.

Naturally, it is also possible to arrange the molecular sieve and the transition metal-containing catalyzer, e.g., an SCR catalyzer, on two separate structural component parts whereby all of the exhaust gas is guided through the pores of the molecular sieve. However, this would result in an appreciably higher exhaust gas counterpressure than is the case in the solutions described above. When the molecular sieve is arranged separately upstream of the transition metal-containing catalyzer, it must be ensured that the exhaust gas is free from solid particles such as soot, for example, because otherwise the molecular sieve pores would become blocked. This is achieved, for example, by arranging the molecular sieve downstream of a particle filter and upstream of the transition metal-containing catalyzer, e.g., an SCR catalyzer. In an arrangement of this kind, the molecular sieve can be arranged as a layer on the outlet side of the particle filter so that the molecular sieve and the particle filter form a unit that cannot be separated without being destroyed. In this case, the coating is carried out in such a way that the pores of the particle filter on its outlet side are completely closed by the molecular sieve so that the exhaust gas must flow through the pores of the molecular sieve. However, for this purpose, especially with high concentrations of hydrocarbons in the exhaust gas, it is usually necessary that the molecular sieve have a hydrocarbon oxidation activity because otherwise the molecular sieve pores would become blocked by unburned hydrocarbons. As was already described above, possible active components include elements belonging to the platinum group of metals, tungsten, titanium, lanthanum, molybdenum, cerium, or manganese.

Although the preceding description in part emphasizes catalyzers for selective catalytic reduction (SCR catalyzers), it should be stressed that the method described above can be used in all transition metal-containing catalyzers in which formation of PCDD and/or PCDF is observed.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

I claim:

1. Apparatus for reducing emissions of polychlorinated dibenzodioxins (PCDD) and polychlorinated dibenzofurans (PCDF) in exhaust gas of an internal combustion engine, the apparatus comprising:
   a transition metal-containing catalyzer for the selective catalytic reduction of nitric oxides in the exhaust gas; and
   a molecular sieve arranged upstream of the transition metal-containing catalyzer, the molecular sieve blocking hydrocarbons from reaching the transition metal-containing catalyzer,
   the molecular sieve being arranged one of:
      on the transition metal-containing layer; and
      as a layer on a carrier upstream of the transition metal-containing layer,
   the molecular sieve having pore diameters in a range between 3 Å and 12 Å, and
   the molecular sieve being devoid of transition metals or having a concentration of at least one transition metal lower than the concentration of said at least one transition metal in the transition metal-containing catalyzer.

2. The apparatus of claim 1 wherein the molecular sieve comprises a molecular sieve layer arranged on the transition metal-containing catalyzer.

3. The apparatus of claim 1 wherein the molecular sieve comprises a molecular sieve layer on a carrier upstream of the transition metal-containing catalyzer.

4. The apparatus of claim 1 wherein the catalyzer contains at least one transition metal selected from the group consisting of copper, iron, and cobalt.

5. The apparatus of claim 1 wherein the transition metal-containing catalyzer is a catalyzer for the selective catalytic reduction of nitric oxides in the exhaust gas by means of at least one of: ammonia and reducing agents that split off ammonia.

6. The apparatus of claim 1 wherein the catalyzer comprises a zeolite structure in which transition metals are embedded.

7. The apparatus of claim 6 wherein the zeolite is one of an MFI zeolite and a BEA zeolite.

8. The apparatus of claim 1 wherein the molecular sieve is based on at least one material selected from the group consisting of zeolites, silicates, metal silicates, aluminates, metal aluminates, silicophosphates, metal silicophosphates, silicoaluminophosphates, aluminophosphates, metal aluminophosphates, and aluminum silicates.

9. The apparatus of claim 1 wherein the molecular sieve comprises at least one zeolite framework selected from the group consisting of AEN, OSI, EPI, ERI, FER, FAU, OFF, MFI, LTL, VFI, MAZ, MEI, EMT, CHA, KFI, BEA, MFS, MEL, MTW, EUO, MTT, HEU, FER, TON, and MOR.

10. The apparatus of claim 1 wherein the molecular sieve comprises at least one zeolite selected from the group consisting of Mordenite, Epistilbite, Chabazite, Erionite, Mazzite, Ferrierite, Faujasite, Offretite, ZSM-3, ZSM-4, ZSM-5, ZSM-12, ZSM-18, ZSM-20, ZSM-22, ZSM-23, ZSM-34, ZSM-35, ZSM-38, ZSM-48, ZSM-50, Omega, Beta, Zeolite A, Zeolite L, Zeolite Y, Zeolite X, ZK-4, ZK-5, ZK-14, ZK-20, ZK-21, and ZK-22.

11. The apparatus of claim 1 wherein the molecular sieve has a concentration of at least one transition metal lower than the concentration of said at least one transition metal in the transition metal-containing catalyzer.

12. The apparatus of claim 11 wherein the molecular sieve has a concentration of copper lower than the concentration of copper in said transition metal-containing catalyzer.

13. The apparatus of claim 11 wherein the molecular sieve has a concentration of iron higher than the concentration of iron in said transition metal-containing catalyzer.

14. The apparatus of claim 1 wherein the molecular sieve has an oxidation activity for hydrocarbons.

15. The apparatus of claim 1 wherein the molecular sieve contains at least one element selected from the group consisting of the platinum group, tungsten, titanium, lanthanum, molybdenum, cerium, manganese, and vanadium.

16. The apparatus of claim 1 further comprising a particle filter, at least one of the transition metal-containing catalyzer and the molecular sieve being arranged on the particle filter.

17. The apparatus of claim 16 wherein the particle filter has an outlet side facing the transition metal-containing catalyzer, the molecular sieve being arranged on the outlet side of the particle filter.

18. The apparatus of claim 16 wherein the particle filter is made of at least one material selected from the group consisting of metal, sintered metal, ceramic, foam, ceramic fibers, quartz fibers, glass fibers, silicon carbide, and aluminum nitrate.

19. The apparatus of claim 1 wherein the molecular sieve has a thickness between least 3 Å and 5 μm.

20. A method for producing an apparatus for reducing emissions of polychlorinated dibenzodioxins (PCDD) and polychlorinated dibenzofurans (PCDF) in exhaust gas of an internal combustion engine, the method comprising:
   producing a transition metal-containing catalyzer for the selective catalytic reduction of nitric oxides in the exhaust gas by one of extrusion and coating a substrate; and
   forming a molecular sieve layer on the catalyzer, the molecular sieve being arranged upstream of the transition metal-containing catalyzer, the molecular sieve having pore diameters in a range between 3 Å and 12 Å, and the molecular sieve being devoid of transition metals or having a concentration of at least one transition metal lower than the concentration of said at least one transition metal in the transition metal-containing catalyzer.

21. The method of claim 20 comprising:
   producing said catalyzer by extruding a transition metal-exchanged zeolite material to produce a catalyzer surface containing at least one transition metal; and
   forming said molecular sieve layer by exchanging at least one transition metal in the catalyzer surface for one a different metal possessing only slight PCDD/PCDF-forming activity and nonmetal cations.

22. The method of claim 20 comprising:
   producing said catalyzer by coating one of a metal and a ceramic substrate with a transition metal-exchanged zeolite material to produce a catalyzer surface containing at least one transition metal; and
   forming said molecular sieve layer by exchanging at least one transition metal in the catalyzer surface for one a different metal possessing only slight PCDD/PCDF-forming activity and nonmetal cations.

\* \* \* \* \*